United States Patent
Ye et al.

(10) Patent No.: US 9,436,021 B2
(45) Date of Patent: Sep. 6, 2016

(54) TUNABLE OPTICAL FILTER, TUNABLE OPTICAL COMPONENT, AND MULTI-WAVELENGTH PASSIVE OPTICAL NETWORK SYSTEM

(71) Applicant: Huawei Technologies Co., Ltd., Shenzhen, Guangdong (CN)

(72) Inventors: Fei Ye, Wuhan (CN); Jianhe Gao, Wuhan (CN); Xuejin Yan, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/577,947

(22) Filed: Dec. 19, 2014

(65) Prior Publication Data
US 2015/0104199 A1 Apr. 16, 2015

Related U.S. Application Data

(63) Continuation of application No. PCT/CN2012/077341, filed on Jun. 21, 2012.

(51) Int. Cl.
*G02F 1/01* (2006.01)
*G02B 6/42* (2006.01)
*H04B 10/61* (2013.01)

(52) U.S. Cl.
CPC ........... *G02F 1/0147* (2013.01); *G02B 6/4215* (2013.01); *H04B 10/615* (2013.01); *G02B 6/4246* (2013.01)

(58) Field of Classification Search
CPC . G02F 1/0147; G02B 6/4215; G02B 6/4246; H04B 10/615

USPC .................. 398/95, 196, 208, 209, 212, 213
See application file for complete search history.

(56) References Cited

U.S. PATENT DOCUMENTS

| | | | |
|---|---|---|---|
| 6,985,281 B2 | 1/2006 | Wagner et al. | |
| 7,002,697 B2 | 2/2006 | Domash et al. | |
| 2002/0025105 A1 | 2/2002 | Okayama | |
| 2002/0135912 A1* | 9/2002 | Ryall | G02B 6/2937 359/892 |
| 2003/0048970 A1 | 3/2003 | Cole et al. | |
| 2003/0072009 A1 | 4/2003 | Domash et al. | |

(Continued)

FOREIGN PATENT DOCUMENTS

| | | |
|---|---|---|
| CN | 1417982 A | 5/2003 |
| CN | 1610851 A | 4/2005 |

(Continued)

*Primary Examiner* — Dalzid Singh

(57) ABSTRACT

The present application provides a tunable optical filter, including: a substrate, a tunable filter unit, a temperature control unit, and an enclosure, where: the substrate, the tunable filter unit, and the temperature control unit are placed inside the enclosure, where the enclosure includes a light incidence window and a light emergence window; the substrate is disposed adjacent to the light incidence window or the light emergence window, and configured to support the tunable filter unit; the temperature control unit is disposed on a surface of the tunable filter unit, and configured to adjust a channel wavelength of the tunable filter unit by means of temperature control; and optical paths of the light incidence window, the tunable filter unit and the light emergence window are aligned. The present application further provides an optical receive component, an optical transceiver component, and a multi-wavelength passive optical network system.

15 Claims, 15 Drawing Sheets

(56) References Cited

U.S. PATENT DOCUMENTS

| | | |
|---|---|---|
| 2003/0091045 A1 | 5/2003 | Choi et al. |
| 2003/0151818 A1 | 8/2003 | Wagner et al. |
| 2005/0105184 A1* | 5/2005 | Ma .................. G01J 3/108 359/578 |
| 2005/0180755 A1 | 8/2005 | Masahiko |
| 2005/0191057 A1* | 9/2005 | Nakamoto .......... G02B 6/4201 398/135 |
| 2006/0228089 A1 | 10/2006 | Shimokozono et al. |
| 2007/0104426 A1* | 5/2007 | Yun .................. G02B 6/4214 385/88 |
| 2008/0144032 A1 | 6/2008 | Miyamae |
| 2010/0150571 A1* | 6/2010 | Nakanishi ........... G02B 6/3861 398/141 |
| 2011/0052125 A1* | 3/2011 | Lee .................. G02B 6/4246 385/88 |
| 2012/0099611 A1* | 4/2012 | Kim .................. H01S 5/141 372/20 |

FOREIGN PATENT DOCUMENTS

| | | |
|---|---|---|
| CN | 1654996 A | 8/2005 |
| CN | 1668961 A | 9/2005 |
| CN | 101098194 A | 1/2008 |
| EP | 0 483 821 B1 | 1/1996 |
| JP | 2002-72260 A | 3/2002 |
| JP | 2009-020201 A | 1/2009 |
| JP | 2009-182997 A | 8/2009 |
| JP | 2009264888 A | 11/2009 |
| JP | 2011-248210 A | 12/2011 |
| WO | WO 01/16637 A1 | 3/2001 |
| WO | WO 03/046630 A1 | 6/2003 |
| WO | WO 2004/111717 A1 | 12/2004 |

\* cited by examiner

TUNABLE OPTICAL FILTER, TUNABLE OPTICAL COMPONENT, AND MULTI-WAVELENGTH PASSIVE OPTICAL NETWORK SYSTEM

CROSS-REFERENCE TO RELATED APPLICATION

This application is a continuation of International Application No. PCT/CN2012/077341, filed on Jun. 21, 2012, which is hereby incorporated by reference in its entirety.

TECHNICAL FIELD

The present application mainly relates to optical communications technologies, and in particular, to a tunable optical filter, a tunable optical component, and a multi-wavelength passive optical network (Passive Optical Network, PON) system.

BACKGROUND

A passive optical network (PON) technology is currently a main broadband access technology. A conventional PON system is a point-to-multipoint network system based on a time division multiplexing (Time Division Multiplexing, TDM) mechanism. Referring to FIG. 1, the PON system generally includes an optical line terminal (Optical Line Terminal, OLT) located on a central office, multiple optical network units (Optical Network Unit, ONU) located on a user side, and an optical distribution network (Optical Distribution Network, ODN) between the OLT and the ONUs. The ODN is used to distribute or multiplex data signals between the OLT and the ONUs so that the multiple ONUs can share an optical transmission path.

In the PON system based on the TDM mechanism, a direction from the OLT to the ONUs is called downstream, the OLT broadcasts a downstream data stream to all the ONUs in a TDM manner, and each ONU receives only the data that carries an identifier of the ONU; a direction from the ONUs to the OLT is called upstream. Because all the ONUs share the optical transmission path, in order to prevent a conflict of upstream data between the ONUs, the PON system uses a Time Division Multiple Access (Time Division Multiple Access, TDMA) manner in the upstream direction. That is, the OLT allocates a timeslot to each ONU, and each ONU sends upstream data in strict accordance with the timeslot allocated by the OLT.

However, the PON system is affected by a time division characteristic of the TDM mechanism, and available bandwidth of a user is generally restricted. In addition, available bandwidth of a fiber itself cannot be effectively used. Therefore, emerging broadband network application service requirements cannot be satisfied. To solve such a problem and in view of compatibility with an existing PON system, a hybrid PON system that integrates a wavelength division multiplexing (Wavelength Division Multiplexing, WDM) technology and the TDM technology is put forward in the industry. In the hybrid PON system, multiple wavelength channels are used between an OLT at a central office and ONUs on a user side to receive and send data. That is, the hybrid PON system is a multi-wavelength PON system.

In the multi-wavelength PON system, the OLT supports data sending and receiving performed simultaneously by using multiple wavelength channels. Each ONU works on one of the wavelength channels separately. In the downstream direction, the OLT uses a downstream wavelength corresponding to each wavelength channel to broadcast downstream data to multiple ONUs that work on the wavelength channel; in the upstream direction, an ONU on each wavelength channel may send, in a timeslot allocated by the OLT, upstream data to the OLT by using an upstream wavelength of the wavelength channel.

To reduce costs, the ONU generally implements data receiving and sending by using a wavelength-tunable optical component. An optical receive component is used as an example. Because there is a linear relationship between an operating wavelength of a tunable filter and temperature within a specific temperature range, a conventional optical receive component makes a receive wavelength tunable by using a tunable optical filter that is based on temperature adjustment. Specifically, in a typical tunable optical receive component, a tunable optical filter is directly placed inside an optical receive TO-CAN and is disposed adjacent to a photodetector; by means of temperature control of a heater or a cooler, an operating wavelength of the tunable optical filter can be adjusted to a downstream wavelength of a downstream wavelength channel on which the ONU currently works. When a multi-wavelength optical signal enters the optical receive TO-CAN from an incidence window, wavelength selection is first implemented by means of a filter function of the tunable optical filter, so that an optical signal of another downstream wavelength is filtered out, and only an optical signal of the downstream wavelength is allowed to pass through and is transmitted to the photodetector, for example, an avalanche photo diode (Avalanche Photo Diode, APD), to implement optical-to-electrical conversion.

However, because a photodetector is generally a temperature-sensitive device, in the foregoing tunable optical component in which the tunable optical filter is placed inside the optical receive TO-CAN, when the operating wavelength of the tunable optical filter is adjusted by means of temperature control, heat generated by the temperature control may have an adverse effect on receiver sensibility of the photodetector, thereby deteriorating performance of an optical receiver.

SUMMARY

To solve the foregoing problem, the present application provides a tunable optical filter that can ensure receiver sensibility of a photodetector, and an optical receive component, an optical transceiver component, and a multi-wavelength passive optical network system that use the tunable optical filter.

A tunable optical filter is provided and includes: a substrate, a tunable filter unit, a temperature control unit, and an enclosure, where: the substrate, the tunable filter unit, and the temperature control unit are placed inside the enclosure, where the enclosure includes a light incidence window and a light emergence window; the substrate is disposed adjacent to the light incidence window or the light emergence window, and configured to support the tunable filter unit; the temperature control unit is disposed on a surface of the tunable filter unit, and configured to adjust a channel wavelength of the tunable filter unit by means of temperature control; and optical paths of the light incidence window, the tunable filter unit and the light emergence window are aligned.

An optical receive component is provided and includes an optical fiber adapter, a tunable optical filter, and an optical receive sub-module, where the tunable optical filter is the tunable optical filter described above, and configured to perform wavelength selection for an optical signal that is input from an optical fiber connected to the optical fiber adapter, and provide the optical receive sub-module with the optical signal that is obtained after the wavelength selection.

An optical transceiver component is provided and includes an optical fiber adapter, a tunable optical filter, an optical receive sub-module, an optical transmit sub-module, and a substrate base, where the substrate base is configured to provide transmitted light of the optical transmit sub-module for an optical fiber connected to the optical fiber adapter, and provide the tunable optical filter with received light that is input by the optical fiber; and the tunable optical filter is the tunable optical filter described above, and configured to perform wavelength selection for the received light, and provide the optical receive sub-module with the received light that is obtained after the wavelength selection.

A multi-wavelength passive optical network system is provided and includes at least one optical line terminal and multiple optical network units, where the at least one optical line terminal is connected to the multiple optical network units by using an optical distribution network in a point-to-multipoint manner, and the optical network unit includes the tunable optical filter described above.

In the tunable optical filter, the optical receive component, the optical transceiver component, and the multi-wavelength passive optical network system provided by the present application, because the tunable filter unit and the temperature control unit of the tunable optical filter are separately independently placed inside the enclosure, and due to a heat isolation function of the enclosure, temperature adjustment for the tunable filter unit performed by the temperature control unit does not have adverse effect on another external temperature-sensitive device (for example, a photodetector). Therefore, performance of the optical components and the multi-wavelength passive optical network system that use the tunable optical filter provided by embodiments can be ensured.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
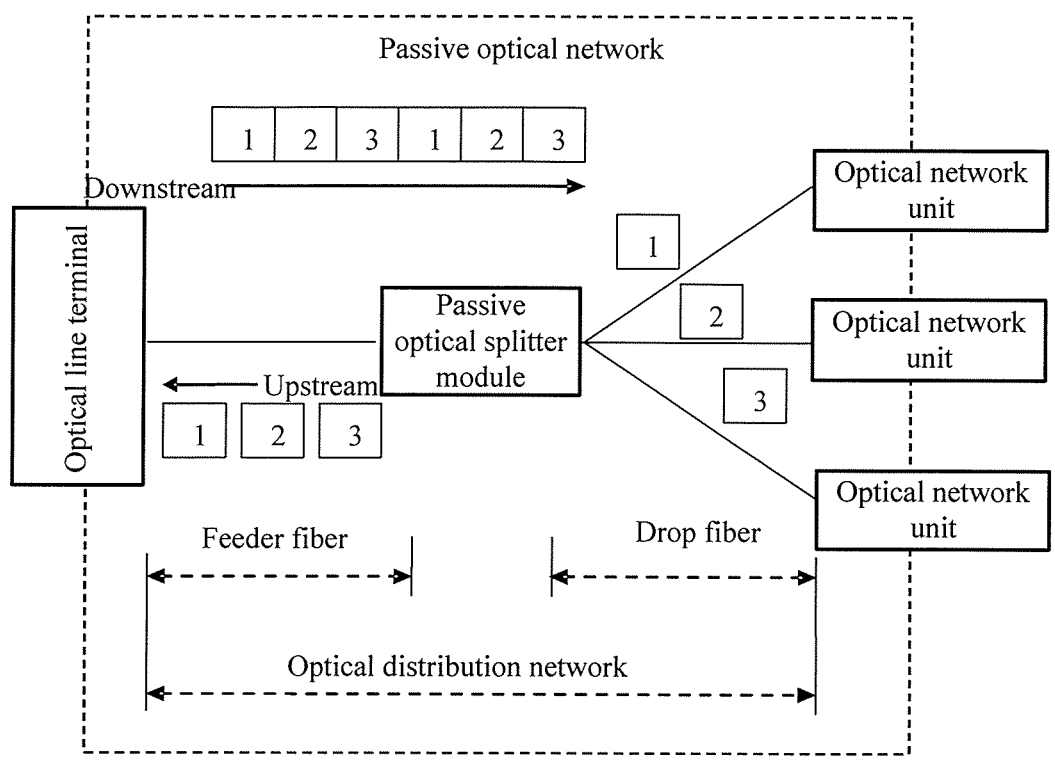
FIG. 1 is a schematic diagram of a network architecture of a passive optical network system based on a time division multiplexing mechanism.
Figure 2:
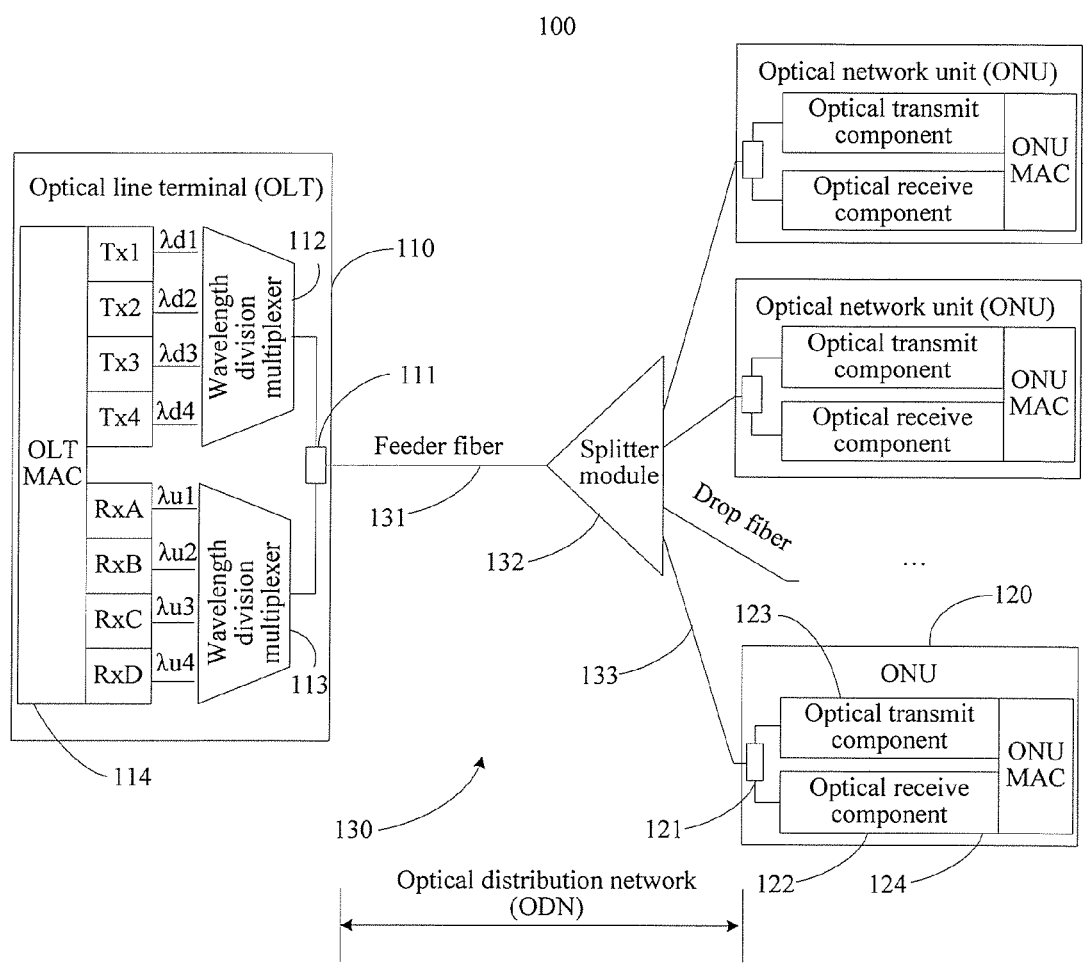
FIG. 2 is a schematic diagram of a network architecture of a multi-wavelength passive optical network system according to an embodiment of the present application.

Refer to FIG. 2, which is a schematic diagram of a network architecture of a multi-wavelength passive optical network system according to an embodiment of the present application. The multi-wavelength PON system 100 includes at least one optical line terminal (OLT) 110, multiple optical network units (ONU) 120, and one optical distribution network (ODN) 130, where the OLT 110 is connected to the multiple ONUs 120 in a point-to-multipoint manner by using the ODN 130, and the multiple ONUs 120 share an optical transmission medium of the ODN 130. The ODN 130 may include a feeder fiber 131, an optical splitter module 132, and multiple drop fibers 133, where the optical splitter module 132 may be disposed on a remote node (Remote Node, RN). The optical splitter module is connected to the OLT 110 by using the feeder fiber 131 on the one hand and connected to the multiple ONUs 120 separately by using the multiple drop fibers 133 on the other hand.

In the multi-wavelength PON system 100, a communication link between the OLT 110 and the multiple ONUs 120 may include multiple upstream wavelength channels and multiple downstream wavelength channels. In a downstream direction, the multiple downstream wavelength channels also share the optical transmission medium of the ODN in a wavelength division multiplexing (WDM) manner, each ONU 120 may work on one of the downstream wavelength channels of the multi-wavelength PON system 100, and each downstream wavelength channel may carry downstream services of one or more ONUs 120; the ONUs 120 that work on a same downstream wavelength channel may share the downstream wavelength channel in a time division multiplexing (TDM) manner. In an upstream direction, the multiple upstream wavelength channels share the optical transmission medium of the ODN 130 in a WDM manner, each ONU 120 may work on one of the upstream wavelength channels of the multi-wavelength PON system 100, and each upstream wavelength channel may carry upstream services of one or more ONUs 120; the ONUs 120 that work on a same upstream wavelength channel may share the upstream wavelength channel in a Time Division Multiple Access (TDMA) manner.

In this embodiment, as shown in FIG. 2, a description is given by using an example in which the multi-wavelength PON system 100 has four upstream wavelength channels and downstream wavelength channels. It should be understood that, in actual application, the number of upstream and downstream wavelength channels of the multi-wavelength PON system 100 may also be determined according to network requirements. For ease of description, in this embodiment, the four upstream wavelength channels of the multi-wavelength PON system 100 are separately named an upstream wavelength channel 1 (which uses a first upstream wavelength $\lambda u1$), an upstream wavelength channel 2 (which uses a second upstream wavelength $\lambda u2$), an upstream wavelength channel 3 (which uses a third upstream wavelength $\lambda u3$), and an upstream wavelength channel 4 (which uses a fourth upstream wavelength $\lambda u4$); the four downstream wavelength channels of the multi-wavelength PON system 100 are separately named a downstream wavelength channel 1 (which uses a first downstream wavelength $\lambda d1$), a downstream wavelength channel 2 (which uses a second downstream wavelength $\lambda d2$), a downstream wavelength channel 3 (which uses a third downstream wavelength $\lambda d3$), and a downstream wavelength channel 4 (which uses a fourth downstream wavelength $\lambda d4$).

In an embodiment, referring to FIG. 2, the OLT 110 may include an optical coupler 111, a first wavelength division multiplexer 112, a second wavelength division multiplexer 113, multiple downstream optical transmit components Tx1 to Tx4, multiple upstream optical receive components Rx1 to Rx4, and a processing module 114. The multiple downstream optical transmit components Tx1 to Tx4 are connected to the optical coupler 111 by using the first wavelength division multiplexer 112, the multiple upstream optical receive components Rx1 to Rx4 are connected to the optical coupler 111 by using the second wavelength division multiplexer 113, and the coupler 111 is further connected to the feeder fiber 131 of the ODN 130.

Transmit wavelengths vary between the multiple downstream optical transmit components Tx1 to Tx4. Each of the downstream optical transmit components Tx1 to Tx4 may correspond to one of the downstream wavelength channels of the multi-wavelength PON system 100. For example, the transmit wavelengths of the multiple downstream optical transmit components Tx1 to Tx4 may be $\lambda d1$ to $\lambda d4$ respectively. The downstream optical transmit components Tx1 to Tx4 may use their respective transmitter wavelengths $\lambda d1$ to $\lambda d4$ to transmit downstream data to corresponding downstream wavelength channels separately, so that the downstream data is received by the ONUs 120 that work on the downstream wavelength channels. Correspondingly, receive wavelengths may vary between the multiple upstream optical receive components Rx1 to Rx4. Each of the upstream optical receive components Rx1 to Rx4 also corresponds to one of the upstream wavelength channels of the multi-wavelength passive optical network system 100. For example, the receive wavelengths of the multiple upstream optical receive components Rx1 to Rx4 may be $\lambda u1$ to $\lambda u4$ respectively. The multiple upstream optical receive components Rx1 to Rx4 may use their respective receive wavelengths $\lambda u1$ to $\lambda u4$ to receive upstream data sent by the ONUs 120 that work on the corresponding upstream wavelength channels.

The first wavelength division multiplexer 112 is configured to: perform wavelength division multiplexing processing on the downstream data that is transmitted by the multiple downstream optical transmit components Tx1 to Tx4 and whose wavelengths are $\lambda d1$ to $\lambda d4$; and use the optical coupler 111 to send the downstream data to the feeder fiber 131 of the ODN 130, so as to provide the downstream data for the ONUs 120 over the ODN 130. In addition, the optical coupler 111 may further be configured to provide the second wavelength division multiplexer 113 with the upstream data that comes from the multiple ONUs 120 and whose wavelengths are $\lambda u1$ to $\lambda u4$, and the second wavelength division multiplexer 113 may demultiplex the upstream data whose wavelengths are $\lambda u1$ to $\lambda u4$ to the upstream optical receive components Rx1 to Rx4 to perform data receiving.

The processing module 114 may be a Media Access Control (Media Access Control, MAC) module. On the one hand, according to a downstream wavelength channel on which an ONU 120 works, the processing module 114 may provide downstream data to be sent to the ONU 120 for a downstream optical transmit component corresponding to the downstream wavelength channel, so that the downstream optical transmit component transmits the downstream data to the wavelength channel; on the other hand, the processing module 114 may perform processing on upstream data that is received by each of the upstream optical receive components Rx1 to Rx4.

Operating wavelengths (including upstream transmit wavelengths and downstream receive wavelengths) of the ONUs 120 are tunable. In a specific embodiment, the ONU 120 may include an optical coupler 121, a downstream optical receive component 122, an upstream optical transmit component 123, and a processing module 124. Both the downstream optical receive component 122 and upstream optical transmit component 123 are wavelength-tunable devices, and they may be connected to a drop fiber corresponding to the ONU 120 by using the optical coupler 121. In an embodiment, the downstream optical receive component 122 and the upstream optical transmit component 123 may further be placed in a same optical transceiver component, for example, placed into a single-fiber bidirectional optical transceiver component. On the one hand, the optical coupler 121 may provide the drop fiber 133 of the ODN 130 with upstream data sent by the upstream optical transmit component 123, so as to send the upstream data to the OLT 110 over the ODN 130; on the other hand, the optical coupler 121 may further provide the downstream optical receive component 122 with the downstream data sent by the OLT 110 over the ODN 130, so as to perform data receiving.

The processing module 124 may be a MAC module, which may on the one hand control the downstream optical receive component 122 and the upstream optical transmit component 123 to perform wavelength adjustment according to a requirement, and may on the other hand provide, in a specific timeslot, the upstream optical transmit component 123 with upstream data that is to be sent to the OLT 110, so that the upstream optical transmit component 23 sends the upstream data to the OLT 110 through a corresponding upstream wavelength channel, and the processing module 124 performs processing on downstream data that is received by the downstream optical receive component 122.

In the multi-wavelength PON system, the downstream optical receive component 122 of the ONU 120 may make a receive wavelength tunable by using the tunable optical filter provided by the present application; in addition, based on the tunable optical filter, the present application further provides a tunable optical receive component and a tunable optical transceiver component that are applicable to the downstream receive component 122 of the ONU 120.

Figure 3:
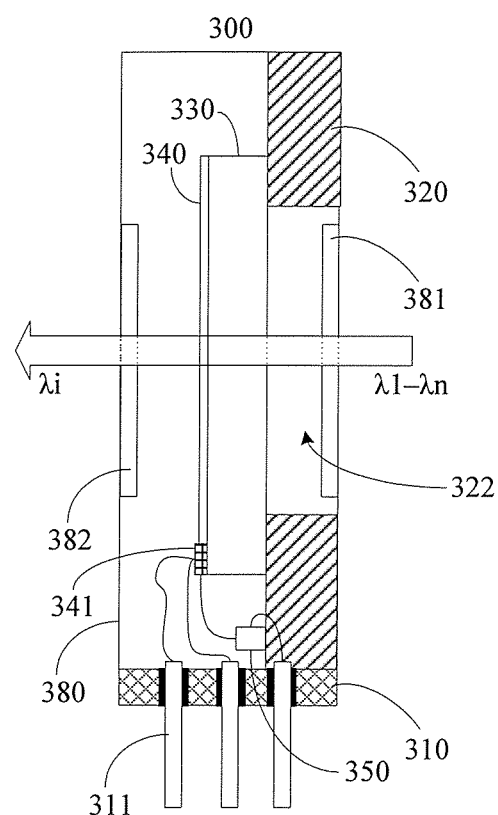
FIG. 3 is a side view of a tunable optical filter according to an embodiment of the present application.
Figure 4:
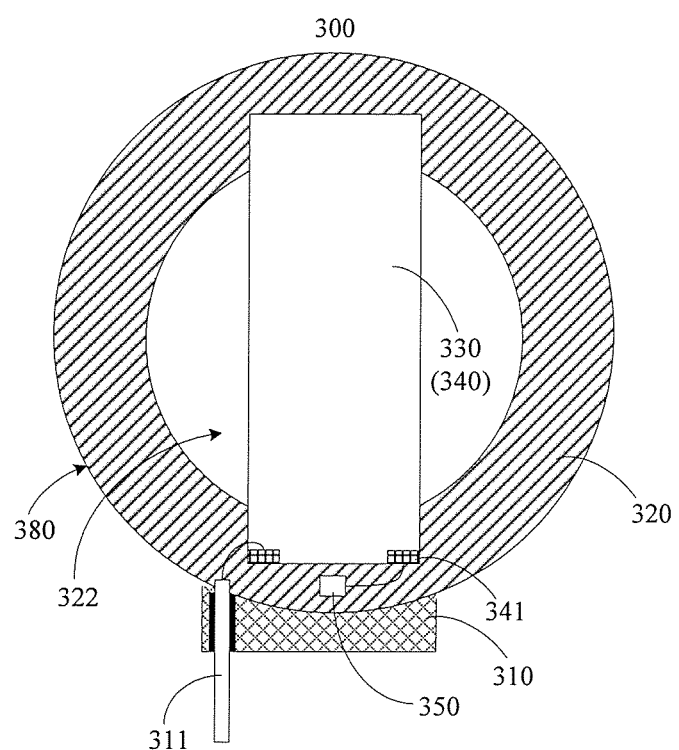
FIG. 4 is a front view of the tunable optical filter shown in FIG. 3.

Refer to FIG. 3 and FIG. 4. FIG. 3 is a side view of a tunable optical filter according to an embodiment of the present application, and FIG. 4 is a front view of the tunable optical filter shown in FIG. 3. The tunable optical filter 300 may include a base 310, a substrate 320, a tunable filter unit 330, a temperature control unit 340, a temperature sensor 350, and an enclosure 380.

The substrate 320, the tunable filter unit 330, the temperature control unit 340, and the temperature sensor 350 may be placed inside the enclosure 380, where the enclosure 380 may be a cylindrical metal casing and has an opening that is disposed at the bottom, and the base 310 may be embedded in and installed on the opening of the enclosure 380, thereby forming one enclosed accommodating space with the enclosure 380. Alternatively, the enclosure 380 may also be a cuboid casing or a casing in another shape. In addition, in a specific embodiment, the accommodating space may be a vacuum, or may be filled with nitrogen or inert gas. The base 310 may be made of a metal material, and has multiple through holes that are separately configured to accommodate and fasten pins 311. The pins 311 may be configured to supply power to the temperature control unit 340 and the temperature sensor 350. In a specific embodiment, if the base 310 is made of a metal material, in order to implement electrical isolation between the pins 311 and the base 310 and between the pins 311, the through hole may be filled with an insulation material inside, for example, a glass filling material may be disposed between the base 310 and the pins 311. In the embodiment shown in FIG. 3, the base 310 has three pins, which are separately called a first pin, a second pin, and a third pin. It should be understood that, in specific implementation, the number of pins may be determined according to a requirement.

The substrate 320 is fastened on one of inner surfaces (namely, a first inner surface) of the enclosure 380, and configured to support the tunable filter unit 330. In an embodiment, the substrate 320 may be made of a ceramic material. Because a ceramic material is light tight, in order to enable a light ray to penetrate through the substrate and be incident on the tunable filter unit 330, the substrate 320 may be designed as a circular structure according to a device requirement, for example, a ring structure, so that a light transmission area 322 is formed by extension from a center of the substrate 320. Correspondingly, in the enclosure 380, a first window 381 is formed on the first inner surface in an area corresponding to the light transmission area 322, and a second window 382 is formed on another inner surface (namely, a second inner surface) opposite to the first inner surface. The first window 381 and the second window 382 may respectively serve as a light incidence window and a light emergence window, and both may be embedded with a transparent material, for example, a glass material, or another material that has a low optical insertion loss and can withstand high temperature.

The tunable filter unit 330 is disposed on a surface of the substrate 320, may be in a round, rectangle or another shape (a rectangle shape is used as an example in the embodiment shown in FIG. 3), and at least partially covers the light transmission area 322; optical paths of the tunable filter unit 330, the first window 381, the light transmission area 322, and the second window 382 are aligned, so as to ensure that an optical signal that is incident from the first window 381 and passes through the light transmission area 322 can enter the tunable filter unit 330. In a specific embodiment, the tunable filter unit 330 may be a temperature-based tunable optical filter device, for example, a tunable thin-film optical filter device. Within a specific temperature range, there is a correspondence between a channel wavelength of the tunable filter unit 330 and temperature. In another alternative embodiment, the tunable filter unit 330 may further be another type of tunable filter device, for example, a liquid crystal tunable filter, a distributed Bragg reflective (Distributed Bragg Reflective, DBR) tunable filter, a fiber Bragg grating (Fiber Bragg Grating, FBG) tunable filter, an acousto-optical tunable filter, or a tunable filter based on micro-electro-mechanical systems (Micro Electro Mechanical Systems, MEMS).

One of surfaces of the tunable filter unit 330 may be in contact with the substrate 320, and the temperature control unit 340 may be disposed on another surface of the tunable filter unit 330. The temperature control unit 340 may be a heater (heater), or a thermoelectric cooler (Thermo Electric Cooler, TEC), and the temperature control unit 340 is configured to adjust a channel wavelength of the tunable filter unit 330 in a temperature control manner such as heating or cooling according to a wavelength requirement.

A heater is used as an example. In an embodiment, the temperature control unit 340 may be made of a light-transmission thin-film that is attached to a surface of the tunable filter unit 330. In another embodiment, the temperature control unit 340 may also be made of a non-transparent material; in this case, the temperature control unit 340 may be a circular structure, for example, in a ring shape, an elliptical ring shape, or a rectangular ring shape, so as to make the tunable filter unit 330 be heated as evenly as possible. Optical paths of a central light transmission area of the temperature control unit 340 that is a circular structure and the tunable filter unit 330 are aligned (that is, optical paths of the temperature control unit 340, the first window 381, the light transmission area 322 of the substrate 320, and the second window 382 are aligned), and a size of the central light transmission area of the temperature control unit 340 is greater than a size of a flare of an optical signal that is output after filtering by the tunable filter unit 330.

In a specific embodiment, the temperature control unit 340 further includes a contact 341, where the contact 341 may be disposed at the bottom of the temperature control unit 340, that is, disposed adjacent to the base 310, and the contact 341 is connected to a pin of the base 310 by using a metal conducting wire. Two contacts 341 are used as an example in the embodiment shown in FIG. 3, where the two contacts 341 are connected to the first pin and the second pin of the base 310 separately. The contacts 341 are configured to receive power signals from the first pin and the second pin, so as to drive the temperature control unit 340 to perform heating or cooling on the tunable filter unit 330.

The temperature sensor 350 may be a thermistor or another temperature-sensitive device configured to monitor temperature of the tunable filter unit 330, and is disposed on a surface of the bottom of the substrate 320 and adjacent to the base 310. On the one hand, the temperature sensor 350 may be connected to the third pin of the base 310 by using a metal conducting wire, so as to receive a power signal from the third pin to perform temperature detection; on the other hand, the temperature sensor 350 may be connected to the contact 341 of the temperature control unit 340, so as to control, according to the detected temperature of the tunable filter unit 330, the temperature control unit 340 to perform wavelength adjustment or locking on the tunable filter unit 330.

In specific application, assuming that an operating wavelength currently required by the tunable optical filter 300 is $\lambda i$, the channel wavelength of the tunable filter unit 330 may be adjusted to the operating wavelength $\lambda i$ by controlling, by the temperature control unit 340, the temperature of the tunable filter unit 330. When an incident light beam having multiple wavelengths (for example, $\lambda 1$ to $\lambda n$) may enter the enclosure 380 of the tunable optical filter 300 through the first window 381, pass through the light transmission area 322 of the substrate 320, and reach the tunable filter unit 330, with a wavelength selection function, the tunable filter unit 330 can filter out any optical signal in the incident light beam except an optical signal with the wavelength $\lambda i$, and only the optical signal with the wavelength $\lambda i$ passes through the tunable filter unit 330 and forms emergent light to be emitted from the second window 382, and the optical signal with the wavelength $\lambda i$ is further received by another external device (for example, a photodetector).

The tunable optical filter 300 provided by the foregoing embodiment is independently placed inside the enclosure 380. Due to a heat isolation function of the enclosure 380, temperature adjustment for the tunable filter unit 330 performed by the temperature control unit 340 does not have adverse effect on another external temperature-sensitive device (for example, a photodetector). Therefore, performance of an optical component using the tunable optical filter 300 provided by the foregoing embodiment can be ensured.

Figure 5:
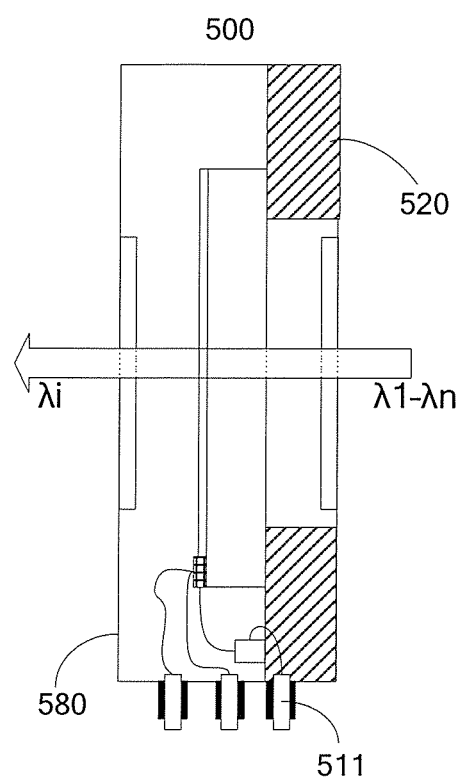
FIG. 5 is a side cutaway view of a tunable optical filter according to another embodiment of the present application.
Figure 6:
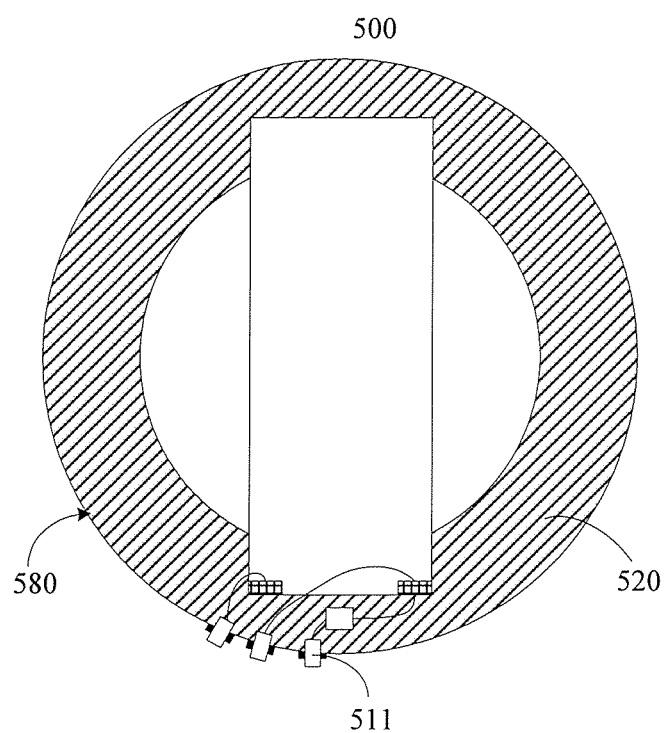
FIG. 6 is a front view of the tunable optical filter shown in FIG. 5.

Refer to FIG. 5 and FIG. 6. FIG. 5 is a side cutaway view of a tunable optical filter according to another embodiment of the present application, and FIG. 6 is a front view of the tunable optical filter shown in FIG. 5. A structure of the tunable optical filter 500 shown in FIG. 5 and FIG. 6 is similar to that of the tunable optical filter 300 shown in FIG. 3 and FIG. 4. However, a main difference between the tunable optical filter 500 shown in FIG. 5 and FIG. 6 and the tunable optical filter 300 shown in FIG. 3 and FIG. 4 lies in that: the tunable optical filter 500 does not have the base 310 of the tunable optical filter 300; in addition, correspondingly, multiple through holes that are configured to accommodate and fasten pins 511 are disposed at the bottom of an enclosure 580 of the tunable optical filter 500, and the through holes may be filled with an insulation material inside to implement electrical isolation between the pins 511 and the enclosure 580, and between the pins 511. Compared with the tunable optical filter 300, without a base, the tunable optical filter 500 that uses the structure shown in FIG. 5 may be smaller in size, and positions of the pins 511 may be more flexible and are not limited to be disposed at the bottom of the enclosure 580. For example, in another alternative embodiment, at least some of the pins 511 may be disposed at a side wall of the enclosure 580, for example, a first side wall that is in contact with a substrate 520, or a second side wall opposite to the first side wall, so that the tunable optical filter 500 is further integrated and placed inside an optical component.

Based on the tunable optical filters 300 and 500 shown in FIG. 3 to FIG. 6, the present application further provides a tunable optical receive component. The tunable optical receive component is applicable to the ONUs 120 in the multi-wavelength passive optical network system 100 shown in FIG. 2.

Figure 7:
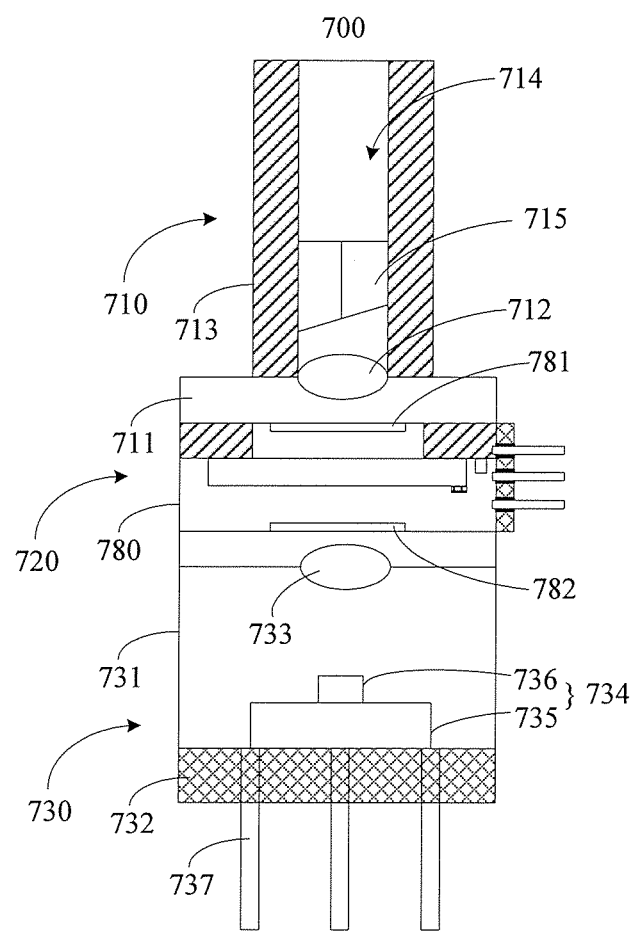
FIG. 7 is a schematic structural diagram of a tunable optical receive component having a tunable optical filter according to an embodiment of the present application.
Figure 8:
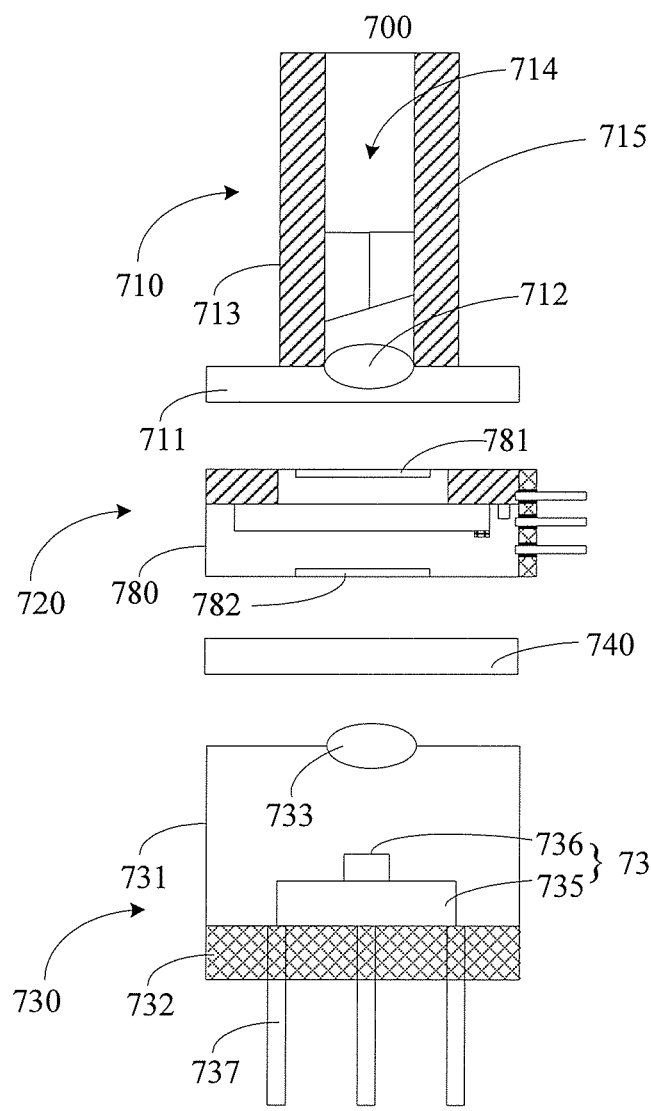
FIG. 8 is a schematic exploded view of a structure of the tunable optical receive component shown in FIG. 7.

Refer to FIG. 7 and FIG. 8. FIG. 7 is a schematic structural diagram of a tunable optical receive component 700 having a tunable optical filter according to an embodiment of the present application, and FIG. 8 is a schematic exploded view of a structure of the tunable optical receive component 700 shown in FIG. 7. The tunable optical receive component 700 includes an optical fiber adapter 710, a tunable optical filter 720, and an optical receive sub-module 730. The tunable optical filter 720 may be the tunable optical filter 300 shown in FIG. 3 and FIG. 4 or the tunable optical filter 500 shown in FIG. 5 and FIG. 6. For a specific structure of the tunable optical filter 720, refer to the description of the foregoing embodiment. The following describes only a structure relationship between the tunable optical filter 720 and the optical fiber adapter 710 and between the tunable optical filter 720 and the optical receive sub-module 730.

The tunable optical filter 720 includes an enclosure 780, where the enclosure 780 includes a first side wall and a second side wall that are opposite to each other, and a first window 781 serving as a light incidence window and a second window 782 serving as a light emergence window are separately disposed on the two side walls, where optical paths of the first window 781 and the second window 782 are aligned.

The optical fiber adapter 710 includes a connection part 711, a collimation lens 712, and a tube 713. The connection part 711 is connected to and fastened on the first side wall of the enclosure 780 of the tunable optical filter 720, and the tube 713 may be disposed on a surface, which is opposite to a surface adjacent to the tunable optical filter 720, of the connection part 711. The tube 713 has an optical fiber accommodating cavity 714, where the optical fiber accommodating cavity 714 is aligned with the first window 781 of the tunable optical filter 720, and the optical fiber accommodating cavity 714 is configured to accommodate an optical fiber 715, for example, a ferrule of the optical fiber 715 may be completely inserted inside the optical fiber accommodating cavity 714 of the tube 713 (that is, no pigtail is left outside), and a cable core of the ferrule is basically aligned with a center of the first window 781. The collimation lens 712 is disposed between the connection part 711 and the tube 713, for example, the collimation lens 712 may be partially embedded on a surface of the connection part 711 and partially accommodated at the bottom of the optical fiber accommodating cavity 714 of the tuber 713, and configured to perform collimation processing on output light from the optical fiber 715 of the optical fiber accommodating cavity 714, so as to convert tapered light, is output by the optical fiber 715 into parallel light, so that all the output light from the optical fiber 715 can basically enter the tunable optical filter through the first window 781.

The optical receive sub-module 730 may include a casing 731, a base 732, a lens 733, and a photodetector 734, where the casing 731 is set on the base 732 and forms an enclosed accommodating space with the base 732, and is configured to accommodate the photodetector 734. The photodetector 734 may include a substrate 735 and an optical receive chip 736, where the substrate 735 is disposed on an inner surface of the base 732 and configured to hold the optical receive chip 736; optical paths of the optical receive chip 736 and the second window 782 of the enclosure 780 of the tunable optical filter 720 are aligned, and the optical receive chip 736 is configured to perform optical-to-electrical conversion on an optical signal, which is emitted from the second window 782 after wavelength conversion is performed on the tunable optical filter 720. The lens 733 may be disposed on a light incidence plane of the casing 731, optical paths of the lens 733 and the second window 782 are aligned, and the lens 733 is configured to converge optical signals, which are emitted from the second window 782, at the optical receive chip 736. Further, the optical receive sub-module 730 may further include multiple pins 737, where the multiple pins 737 are connected to the photodetector 734, and extend from the base 732. The multiple pins 737 may supply power to the optical receive chip 736 of the photodetector 734 on the one hand, and may output an electrical signal, which is formed by means of optical-to-electrical conversion performed by the optical receive chip 736, to another external device on the other hand.

In a specific embodiment, the optical receive sub-module 730 may be fastened on the tunable optical filter 720 by using a metal ring 740, for example, the metal ring 740 may be partially set on the tunable optical filter 720 and partially set on the optical receive sub-module 730, so that the light incidence plane of the casing 731 is opposite to the second side wall of the tunable optical filter 720, and optical paths of the lens 733 and the second window 782 are aligned. It should be understood that, in another alternative embodiment, the metal ring 740 may also be replaced by another fastener, as long as the fastener can fasten the optical receive sub-module 730 on the tunable optical filter 720 and make them align with each other.

Figure 9:
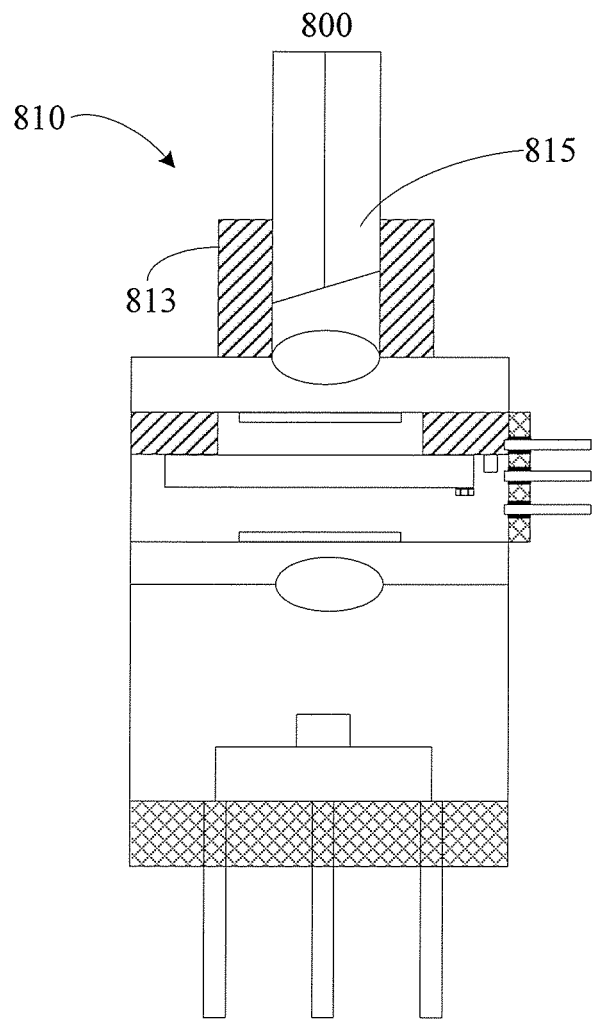
FIG. 9 is a schematic structural diagram of a tunable optical receive component having a tunable optical filter according to another embodiment of the present application.

Refer to FIG. 9. FIG. 9 is a schematic structural diagram of a tunable optical receive component having a tunable optical filter according to another embodiment of the present application. A structure of the tunable optical receive component 800 shown in FIG. 9 is similar to that of the tunable optical receive component 700 shown in FIG. 7 and FIG. 8, and a main difference lies in that: in an optical fiber adapter 810 of the tunable optical receive component 800 shown in FIG. 9, only a part of an optical fiber 815 is accommodated inside an optical fiber accommodating cavity of a tube 813, while the other part extends from the top of the optical fiber accommodating cavity to form a pigtail.

Figure 10:
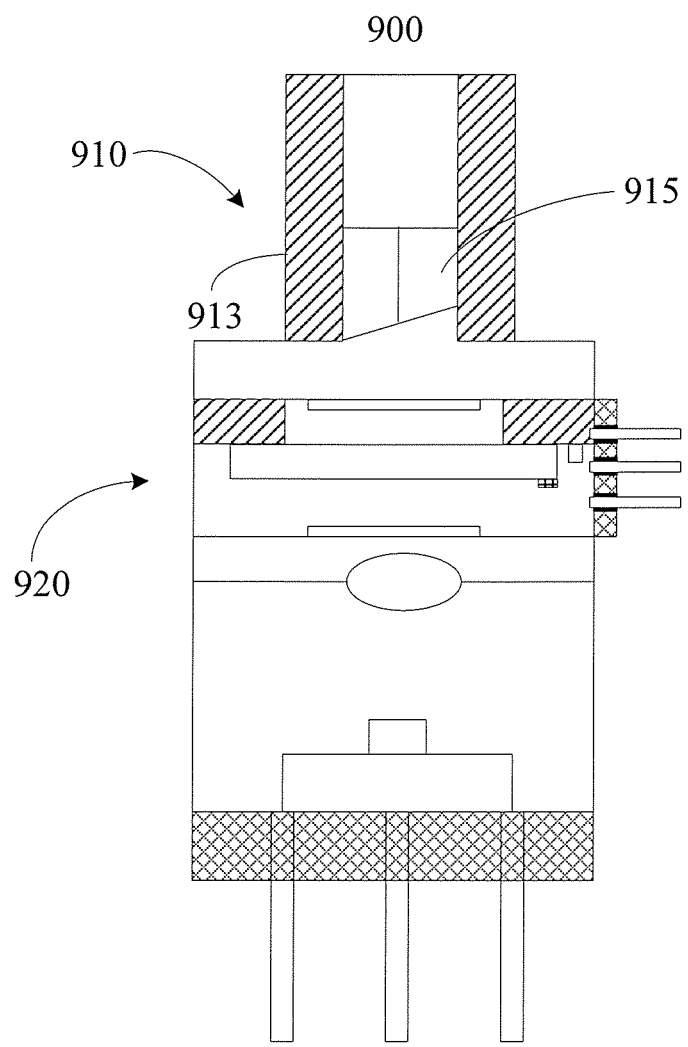
FIG. 10 is a schematic structural diagram of a tunable optical receive component having a tunable optical filter according to another embodiment of the present application.

Refer to FIG. 10. FIG. 10 is a schematic structural diagram of a tunable optical receive component having a tunable optical filter according to another embodiment of the present application. A structure of the tunable optical receive component 900 shown in FIG. 10 is similar to that of the tunable optical receive component 700 shown in FIG. 7 and FIG. 8, and a main difference lies in that: an optical fiber adapter 910 of the tunable optical receive component 900 shown in FIG. 10 does not have a collimation lens. Without the collimation lens, output light from an optical fiber 915 accommodated in a tube 913 is incident on a tunable optical filter 920 directly in a form of tapered light.

In the tunable optical receive components 700, 800 and 900 shown in FIG. 7 to FIG. 10, preferably, the tunable optical filters 720, 820 and 920 may use a structure of the tunable optical filter 300 shown in FIG. 3 and FIG. 4, so as to facilitate placement and pin connection. Certainly, it should be understood that it is also feasible to use a structure of the tunable optical filter 500 shown in FIG. 5 and FIG. 6.

Based on the tunable optical filters 300 and 500 shown in FIG. 3 to FIG. 6, the present application further provides a tunable optical transceiver component. The tunable optical transceiver component is applicable to the ONUs 120 in the multi-wavelength passive optical network system 100 shown in FIG. 2.

Figure 11:
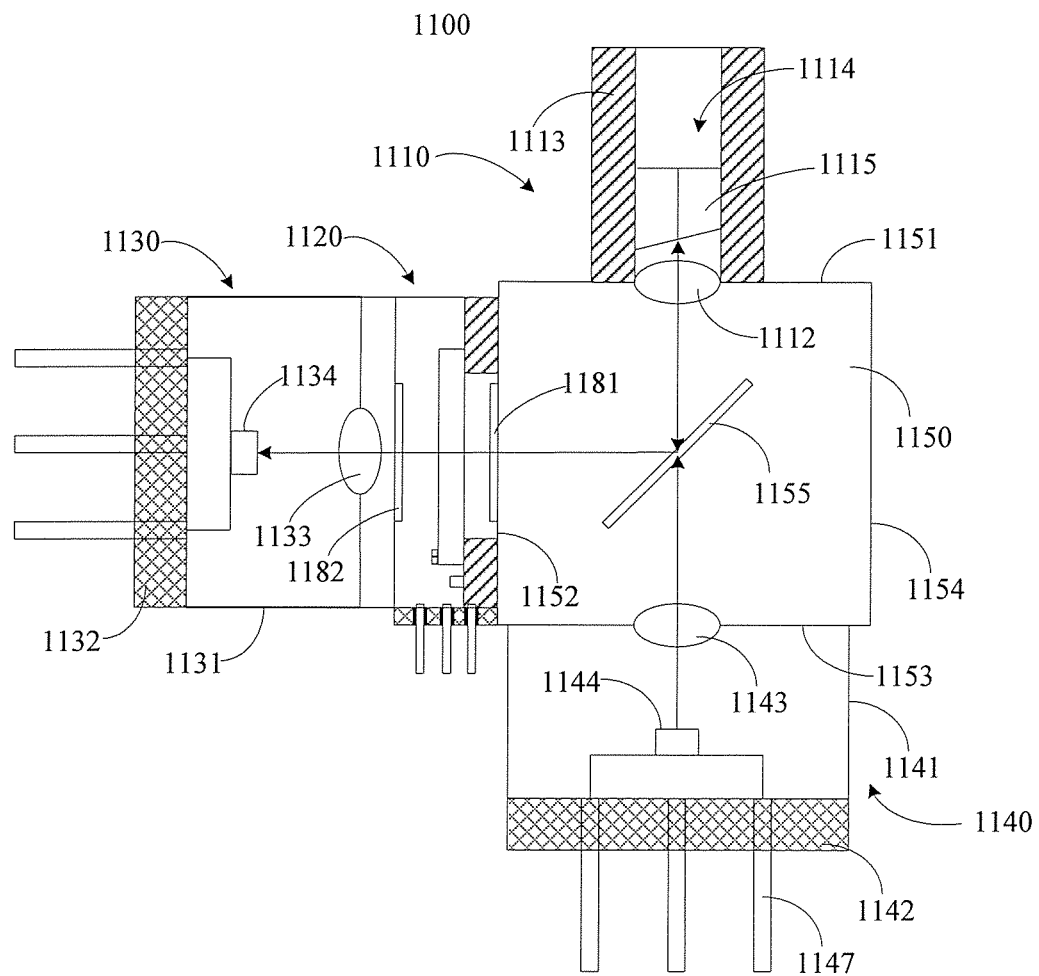
FIG. 11 is a schematic structural diagram of a tunable optical transceiver component having a tunable optical filter according to an embodiment of the present application.
Figure 12:
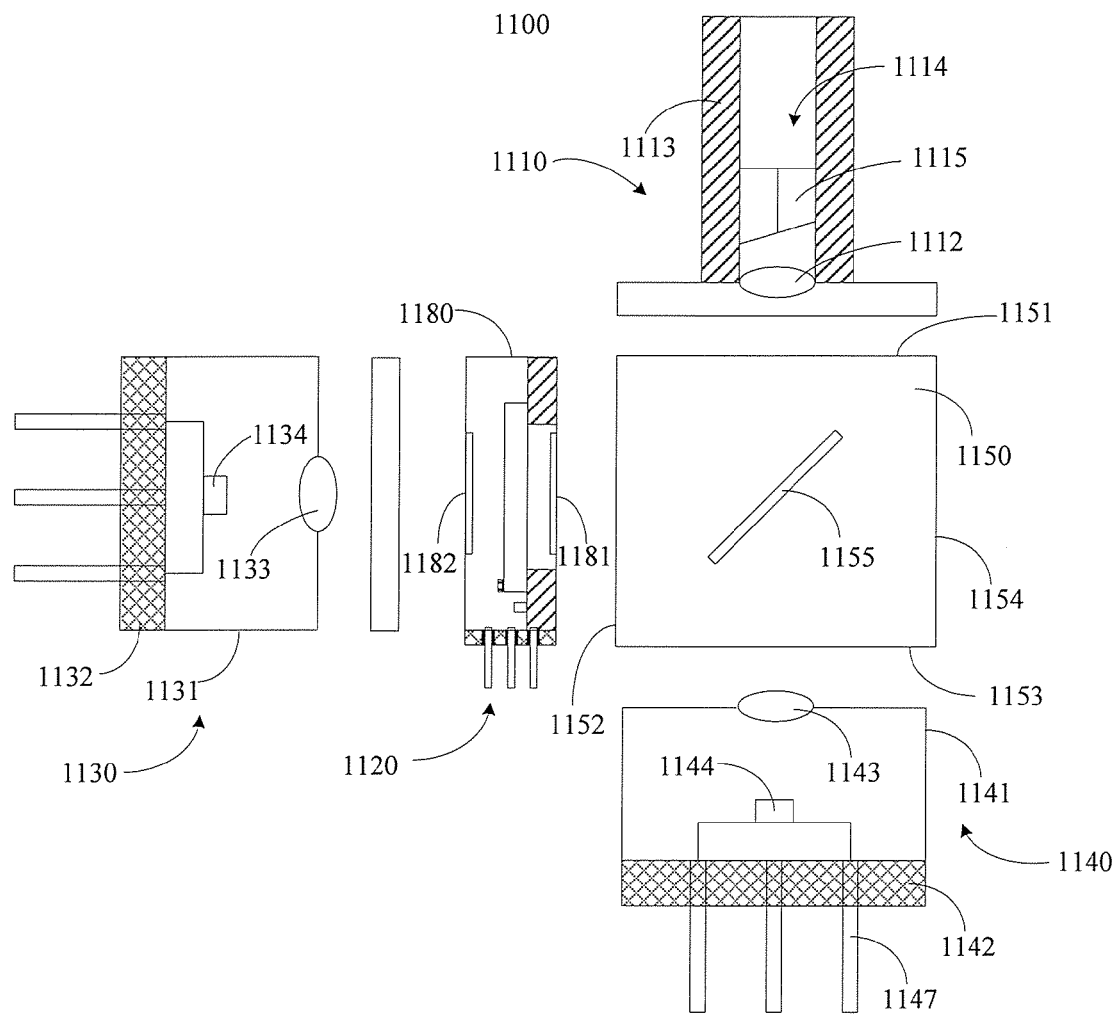
FIG. 12 is a schematic exploded view of a structure of the tunable optical transceiver component shown in FIG. 11.

Refer to FIG. 11 and FIG. 12. FIG. 11 is a schematic structural diagram of a tunable optical transceiver component having a tunable optical filter according to an embodiment of the present application, and FIG. 12 is a schematic exploded view of a structure of the tunable optical transceiver component shown in FIG. 11. The tunable optical transceiver component 1100 shown in FIG. 11 includes an optical fiber adapter 1110, a tunable optical filter 1120, an optical receive sub-module 1130, an optical transmit sub-module 1140, and a substrate base 1150. The tunable optical filter 300 shown in FIG. 3 and FIG. 4 or the tunable optical filter 500 shown in FIG. 5 and FIG. 6 may be used as the tunable optical filter 1120. For a specific structure of the tunable optical filter 1120, refer to the description of related embodiments. The optical receive sub-module shown in FIG. 7 may be used as the optical receive sub-module 1130. For a specific structure of the optical receive sub-module 1130, also refer to the description of related embodiments.

The substrate base 1150 may include a first side wall 1151, a second side wall 1152 adjacent to the first side wall 1151, a third side wall 1153 opposite to the first side wall 1151, and a fourth side wall 1154 opposite to the second side wall 1152, where the first side wall 1151, the second side wall 1152, the third side wall 1153, and the fourth side wall 1154 are connected end to end to form a square seat. The first side wall 1151, the second side wall 1152, and the third side wall 1153 separately have an optical transmit window.

The optical fiber adapter 1110 is connected to and fastened on the first side wall 1151 of the substrate base 1150. The optical fiber adapter 1110 may include a collimation lens 1112 and a tube 1113, where the tube 1113 may be installed on the first side wall 1151 of the substrate base 1150, the tube 1113 has an optical fiber accommodating cavity 1114 configured to accommodate an optical fiber 1115, and the optical fiber accommodating cavity 1114 is aligned with the optical transmit window of the first side wall 1151. In an embodiment, a ferrule of the optical fiber 1115 may be completely inserted inside the optical fiber accommodating cavity 1114 of the tube 1113 (that is, no pigtail is left outside), and a cable core of the ferrule is basically aligned with a center of the optical transmit window of the first side wall 1151. The collimation lens 1112 is disposed between the first side wall 1151 of the substrate base 1150 and the tube 1113, for example, the collimation lens 1112 may be partially embedded in the first side wall 1151 and partially accommodated at the bottom of optical fiber accommodating cavity 1114 of the tube 1113, and configured to perform collimation processing on output light from the optical fiber 1115 of the optical fiber accommodating cavity 1114; in addition, the collimation lens 1112 may further converge emergent light at the optical fiber 1115.

The tunable optical filter 1120 may include an enclosure 1180, where the enclosure 1180 includes a first side wall and a second side wall that are opposite to each other, and a first window 1181 serving as a light incidence window and a second window 1182 serving as a light emergence window are separately disposed on the two side walls, where optical paths of the first window 1181 and the second window 1182 are aligned. The second side wall of the enclosure 1180 may be installed and fastened on the second side wall 1152 of the substrate base 1150, and the first window 1181 is aligned with the optical transmit window of the second side wall 1152.

The optical receive sub-module 1130 includes a casing 1131, a tube holder 1132, a first lens 1133, and a photodetector 1134, where the photodetector 1134 is disposed in an accommodating space jointly formed by the casing 1131 and the tube holder 1132, the first lens 1133 may be disposed on a light incidence plane of the casing 1131 and is disposed opposite to the second side wall of the enclosure 1180 of the tunable filter 1120, and the optical receive sub-module 1130 may be fastened to the tunable optical filter 1120 by using a metal ring, so that optical paths of the second window 1182, the first lens 1133, and the photodetector 1134 are aligned.

The optical transmit sub-module 1140 may include a casing 1141, a base 1142, a second lens 1143, and an optical transmitter 1144, where the optical transmitter 1144 is disposed inside an accommodating space jointly formed by the casing 1141 and the tube holder 1142, for example, the optical transmitter 1144 may be disposed on a surface of the tube holder 1142, and is disposed facing a direction in which light of the optical transmit sub-module 1140 is emitted. A light emergence plane of the casing 1141 may be installed and fastened on the third side wall 1153 of the substrate base 1150. The second lens 1143 may be disposed on the light emergence plane of the casing 1141, and configured to converge optical signals that are transmitted by the optical transmitter 1144, and input the optical signals to the substrate base 1150 through the optical transmit window of the third side wall 1153. Optical paths of the optical transmitter 1144, the second lens 1143, and the optical transmit window of the third side wall 1153 are aligned. Further, the optical transmit sub-module 1140 may further include multiple pins 1147, where the multiple pins 1147 are connected to the optical transmitter 1144 and extend from the base 1142, and the multiple pins 1147 may supply power to the optical transmitter 1144 on the one hand, and may provide to-be-transmitted data of the optical transmitter 1144 for the optical transmitter 1144 on the other hand, so that the optical transmitter 1144 transmits the to-be-transmitted data in a manner of an optical signal.

In addition, a wavelength division multiplexing (Wavelength Division Multiplexing, WDM) filtering sheet 1155 may be further disposed inside the substrate base 1150, where the wavelength division multiplexing filtering sheet 1155 may be disposed on a central position of the substrate base 1150 at a tilt angle of approximately 45 degrees (that is, as a 45-degree optical filtering sheet), and is opposite to the first side wall 1151, the second side wall 1152, and the third side wall 1153 of the substrate base 1150. On the one hand, the WDM filtering sheet 1155 may transmit emitted light, which comes from the optical transmitter 1144 and enters the substrate base 1150 through the optical transmit window of the third side wall 1153, to the optical transmit window of the first side wall 1151, so as to transmit the emitted light by using the optical fiber 1115; on the other hand, the WDM filtering sheet 1155 may further reflect received light, which is output from the optical fiber 1115 and enters the substrate base 1150 through the optical transmit window of the first side wall 1151, to the optical transmit window of the second side wall 1152, so that the received light is received by the photodetector 1134 of the optical receive sub-module 1130.

Figure 13:
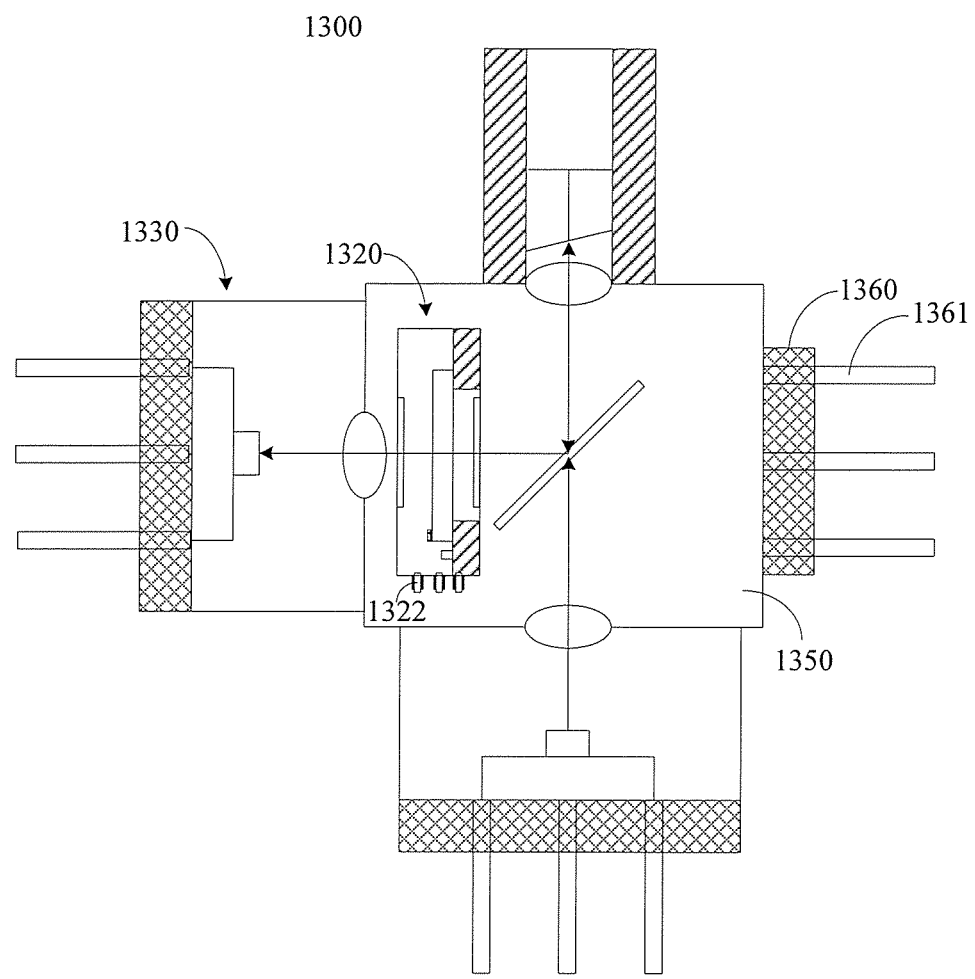
FIG. 13 is a schematic structural diagram of a tunable optical transceiver component having a tunable optical filter according to another embodiment of the present application.
Figure 14:
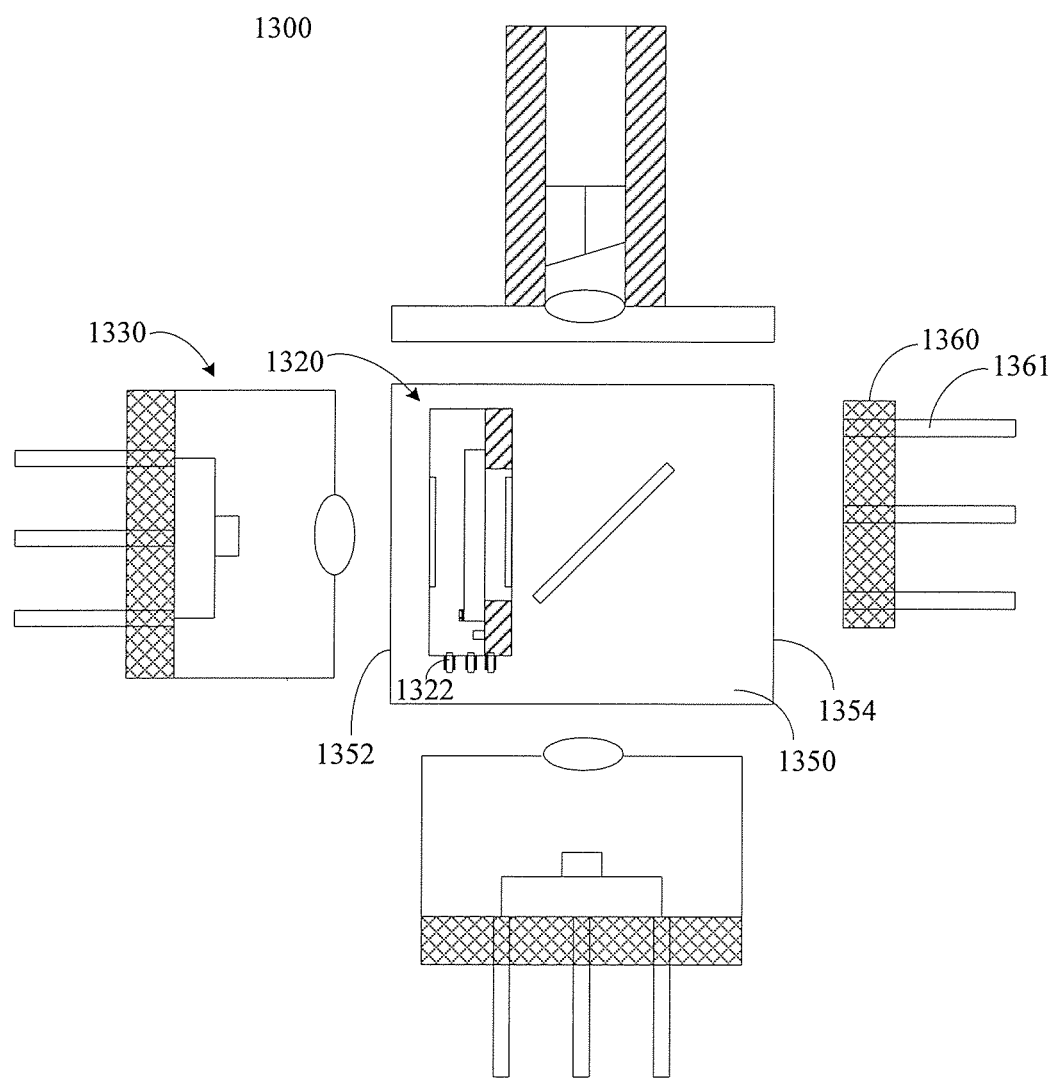
FIG. 14 is a schematic exploded view of a structure of the tunable optical transceiver component shown in FIG. 13.

Refer to FIG. 13 and FIG. 14. FIG. 13 is a schematic structural diagram of a tunable optical transceiver component having a tunable optical filter according to another embodiment of the present application, and FIG. 14 is a schematic exploded view of a structure of the tunable optical transceiver component shown in FIG. 13. A structure of the tunable optical transceiver component 1300 shown in FIG. 13 is similar to that of the tunable optical transceiver component 1100 shown in FIG. 11, and a main difference lies in that: in the tunable optical transceiver component 1300, a tunable optical filter 1320 is not disposed between a second side wall 1352 of a substrate base 1350 and an optical receive sub-module 1330, but is directly placed inside the substrate base 1350 along a receive optical path of the optical receive sub-module 1330. In addition, in order to facilitate power supply to the tunable optical filter 1320, in this embodiment, the tunable optical transceiver component 1300 may further include an external pin 1360 that is disposed on a fourth side wall 1354 of the substrate base 1350, and a pin 1322 of the tunable optical filter 1320 may be connected to a pin 1361 of the external tube holder 1360 by using an internal conducting wire of the substrate base 1350.

Figure 15:
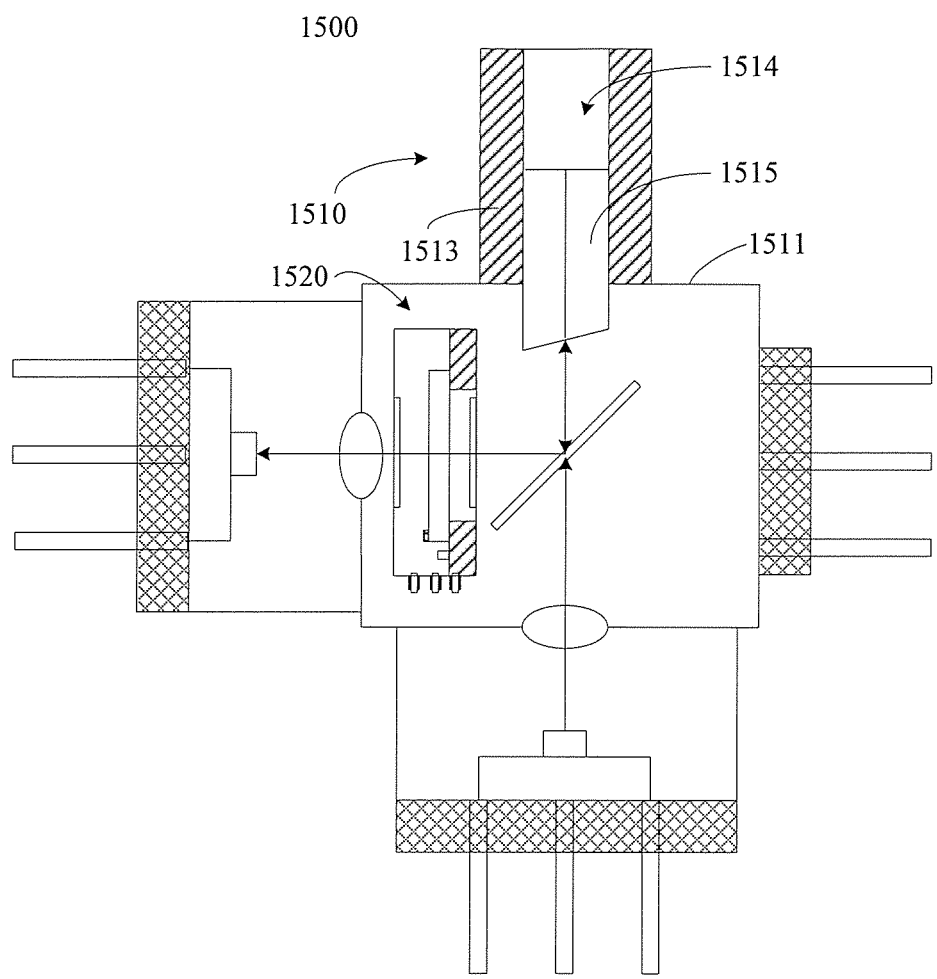
FIG. 15 is a schematic structural diagram of a tunable optical transceiver component having a tunable optical filter according to another embodiment of the present application.

FIG. 15 is a schematic structural diagram of a tunable optical transceiver component having a tunable optical filter according to another embodiment of the present application. A structure of the tunable optical transceiver component 1500 shown in FIG. 15 is similar to that of the tunable optical transceiver component 1300 shown in FIG. 13, and a main difference lies in that: an optical fiber adapter 1510 of the tunable optical transceiver component 1500 does not have a collimation lens, and correspondingly, a ferrule part of an optical fiber 1515, which is accommodated in an optical fiber accommodating cavity 1514 of a tube 1513, passes through an optical transmit window of a first side wall 1551 of a substrate base 1550, and enters the substrate base 1550.

In the tunable optical transceiver components 1100, 1300 and 1500 shown in FIG. 11 to FIG. 15, preferably, the tunable optical filter 1120 of the tunable optical transceiver component 1100 may use a structure of the tunable optical filter 300 shown in FIG. 3 and FIG. 4, and the tunable optical filters 1320 and 1520 of the tunable optical transceiver components 1300 and 1500 may use the structure of the tunable optical filter 500 shown in FIG. 5 and FIG. 6 so as to facilitate placement and pin connection. Certainly, it should be understood that the structure of the tunable optical filter 500 shown in FIG. 5 and FIG. 6 is also applicable to the tunable optical filter 1120, and the structure of the tunable optical filter 300 shown in FIG. 3 and FIG. 4 is also applicable to the tunable optical filters 1320 and 1520.

The foregoing descriptions are merely exemplary specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A tunable optical filter, comprising a substrate, a tunable filter unit, a temperature control unit, and an enclosure, wherein:
the substrate, the tunable filter unit, and the temperature control unit are placed inside the enclosure, wherein the enclosure comprises a light incidence window and a light emergence window;
the substrate is disposed adjacent to the light incidence window or the light emergence window, and configured to support the tunable filter unit;
the temperature control unit is disposed on a surface of the tunable filter unit, and configured to adjust a channel wavelength of the tunable filter unit by means of temperature control; and
an optical path of the light incidence window, an optical path of the tunable filter unit and an optical path of the light emergence window are aligned,
wherein the tunable optical filter further comprises a temperature sensor that is disposed at a bottom of the substrate, connected to the temperature control unit by using a conducting wire, and configured to control, according to detected temperature of the tunable filter unit, the temperature control unit to perform wavelength adjustment or locking on the tunable filter unit.

2. The tunable optical filter according to claim 1, wherein the substrate has a light transmission area, and an optical path of the light transmission area, the optical path of the light incidence window and the optical path of the tunable filter unit are aligned.

3. The tunable optical filter according to claim 2, wherein the substrate has a circular structure.

4. The tunable optical filter according to claim 1, wherein the temperature control unit comprises two contacts that are disposed at a bottom of the temperature control unit, connected to a first pin and a second pin of the tunable optical filter by using conducting wires, and configured to receive power signals from the first pin and the second pin, so as to drive the temperature control unit to perform temperature control on the tunable filter unit.

5. The tunable optical filter according to claim 4, wherein the temperature sensor is connected to a third pin of the tunable optical filter by using a conducting wire, and configured to receive a power signal from the third pin to perform temperature detection.

6. The tunable optical filter according to claim 5, further comprising a base that is embedded in an opening at a bottom of the enclosure and forms one enclosed accommodating space with the enclosure,
wherein the base has multiple through holes,
wherein the first pin, the second pin and the third pin pass through the through holes of the base and are fastened on the through holes of the base.

7. The tunable optical filter according to claim 5, wherein:
a bottom of the enclosure has multiple through holes; and
the first pin, the second pin and the third pin pass through the through holes at the bottom of the enclosure and are fastened on the through holes at the bottom of the enclosure.

8. The tunable optical filter according to claim 1, wherein:
the temperature control unit has a circular structure; and
an optical path of a central light transmission area of the temperature control unit, the optical path of the tunable filter unit, and the optical path of the light emergence window are aligned.

9. The tunable optical filter according to claim 1, wherein the temperature control unit uses a transparent thin-film.

10. An optical receive component, comprising an optical fiber adapter, a tunable optical filter, and an optical receive sub-module, wherein:
the tunable optical filter is configured to perform a wavelength selection for an optical signal that is input from an optical fiber connected to the optical fiber adapter, and provide the optical receive sub-module with an optical signal that is obtained after the wavelength selection; and
the tunable optical filter comprises: a substrate, a tunable filter unit, a temperature control unit, and an enclosure, wherein:
the substrate, the tunable filter unit, and the temperature control unit are placed inside the enclosure, wherein the enclosure comprises a light incidence window and a light emergence window,
the substrate is disposed adjacent to the light incidence window or the light emergence window, and configured to support the tunable filter unit,
the temperature control unit is disposed on a surface of the tunable filter unit, and configured to adjust a channel wavelength of the tunable filter unit by means of temperature control, and
an optical path of the light incidence window, an optical path of the tunable filter unit and an optical path of the light emergence window are aligned,
wherein the optical receive sub-module is fastened on the tunable optical filter by using a metal ring, and the metal ring is partially set on the tunable optical filter and is partially set on the optical receive sub-module.

11. The optical receive component according to claim 10, wherein an optical path of the optical fiber adapter and an optical path of a light incidence window of the tunable optical filter are aligned, and an optical path of the optical receive sub-module and an optical path of a light emergence window of the tunable optical filter are aligned.

12. The optical receive component according to claim 10, wherein the optical fiber adapter comprises a collimation lens configured to perform collimation processing on an output light of an optical fiber.

13. An optical transceiver component, comprising an optical fiber adapter, a tunable optical filter, an optical receive sub-module, an optical transmit sub-module, and a substrate base, wherein:
the substrate base is configured to provide transmitted light of the optical transmit sub-module for an optical fiber connected to the optical fiber adapter, and provide the tunable optical filter with received light that is input by the optical fiber; and
the tunable optical filter is configured to perform wavelength selection for the received light, and provide the optical receive sub-module with the received light that is obtained after the wavelength selection,
wherein the tunable optical filter is disposed between the substrate base and the optical receive sub-module.

14. The optical transceiver component according to claim 13, wherein the tunable optical filter is disposed inside the substrate base, and connected to an external pin by using a conducting wire.

15. A multi-wavelength passive optical network system, comprising at least one optical line terminal (OLT) and multiple optical network units (ONUs), wherein the at least one OLT is connected to the multiple ONUs by using an optical distribution network in a point-to-multipoint manner, and at least one of the ONUs comprise a tunable optical filter comprising: a substrate, a tunable filter unit, a temperature control unit, and an enclosure, wherein:
the substrate, the tunable filter unit, and the temperature control unit are placed inside the enclosure, wherein the enclosure comprises a light incidence window and a light emergence window;
the substrate is disposed adjacent to the light incidence window or the light emergence window, and configured to support the tunable filter unit;
the temperature control unit is disposed on a surface of the tunable filter unit, and configured to adjust a channel wavelength of the tunable filter unit by means of temperature control; and
an optical path of the light incidence window, an optical path of the tunable filter unit and an optical path of the light emergence window are aligned,
wherein the tunable optical filter further comprises a temperature sensor that is disposed at a bottom of the substrate, connected to the temperature control unit by using a conducting wire, and configured to control, according to detected temperature of the tunable filter unit, the temperature control unit to perform wavelength adjustment or locking on the tunable filter unit.

* * * * *